June 3, 1930. L. MAMBOURG 1,761,219
SHEET GLASS WIDTH MAINTAINING DEVICE
Filed March 5, 1926
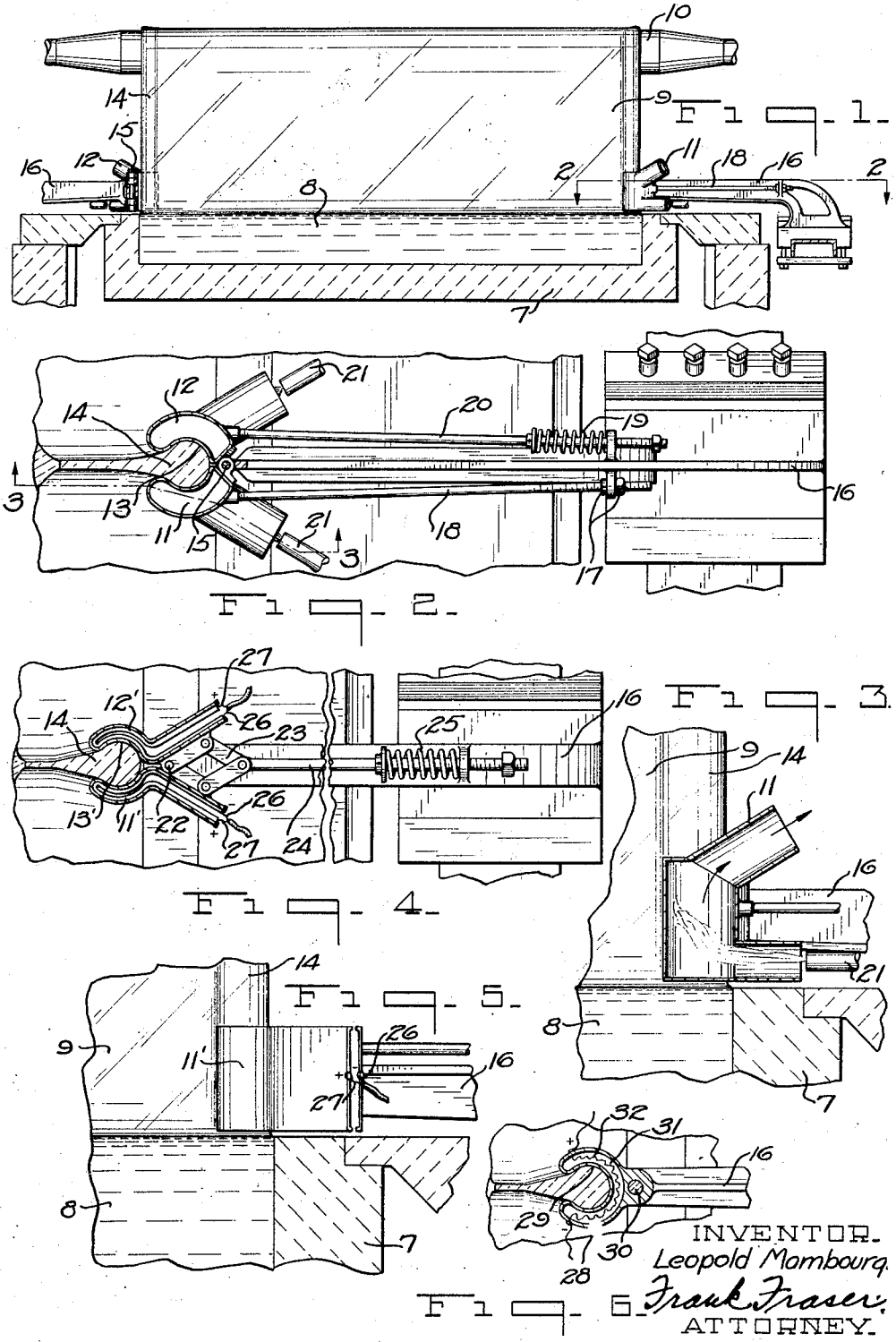
INVENTOR.
Leopold Mambourg.
Frank Fraser
ATTORNEY.

Patented June 3, 1930

1,761,219

UNITED STATES PATENT OFFICE

LEOPOLD MAMBOURG, OF LANCASTER, OHIO, ASSIGNOR TO LIBBEY-OWENS GLASS COMPANY, OF TOLEDO, OHIO, A CORPORATION OF OHIO

SHEET-GLASS-WIDTH-MAINTAINING DEVICE

Application filed March 5, 1926. Serial No. 92,395.

The present invention relates to sheet glass apparatus, and has particular reference to an improved process and apparatus for resisting the contracting tendency of a continuously drawn sheet of glass.

An object of the invention is to provide means at the edges of a continuously drawn sheet of glass that will conform to the shape of the glass forming the edges or border portions of said sheet, and to cause this glass to slightly cling to said means, thus creating a tension in the sheet at right angles to the drawing force.

Another object of the invention is to allow the sheet borders of a continuously drawn sheet of glass to cling to the sides of a member having a relatively high temperature through which they are drawn, thus holding the sheet to width.

A further object of the invention is to prevent the sheet borders of a continuously drawn sheet of glass from laterally pulling out of the slot through which they are vertically drawn by maintaining the slot at a relatively high temperature.

A still further object of the invention is to create a drag at the sheet borders of a continuously drawn sheet of glass by allowing the glass forming said sheet borders to cling to the sides of the slot, having a relatively high temperature, through which they are drawn.

Other objects and advantages of this invention will become apparent during the course of the following description.

In the drawings wherein like numerals are employed to designate like parts throughout the same, Fig. 1 is a transverse section of a sheet glass drawing machine showing the improved device in position, Fig. 2 is a section taken substantially on line 2—2 in Fig. 1, Fig. 3 is a sectional elevation taken substantially on line 3—3 in Fig. 2, Fig. 4 is a modified form of the device, Fig. 5 is an elevation of the device shown in Fig. 4, and Fig. 6 is another form of the improved device.

Referring to the drawings in detail, the numeral 7 refers to a draw pot containing a mass of molten glass 8, from which the glass sheet 9 is vertically drawn and then deflected into the horizontal over bending roll 10.

It is a well known fact in the art of drawing sheet glass from a mass of molten glass, that the sheet will tend to narrow at its base, and unless means are provided for overcoming this narrowing tendency, the sheet will pull to a string or thread. It is therefore the principal object of this invention to provide an improved means at the sheet edges or borders to overcome the narrowing tendency of the sheet. It is to be understood that the present invention may be used in connection with most any sheet glass drawing apparatus, and is therefore not limited to the apparatus illustrated in the drawings.

In accordance with the present invention the sheet is held to width by means of a pair of members or jaws 11 and 12, forming a slot 13 through which the sheet borders 14 may be drawn. The jaws are mounted and pivotally associated with each other by a pin 15 upon the end of bifurcated supporting bracket 16. As shown in Fig. 2, the member 11 may be mounted in a fixed position and adjusted to the desired location by the adjusting nut 17 upon its tie rod 18, while the member 12 is free to swing about the pin 15, the normal tendency thereof, however, being to swing inwardly, caused by the action of the comparatively weak compression spring 19 associated with its tie rod 20, thus permitting the slot 13 to freely conform at all times to the shape of the sheet borders 14 as they decrease or increase in thickness.

It will be noted that the jaws or members 11 and 12 do not bite into the sheet borders but merely allow the slot 13 formed by them to engage and conform therewith. The members are preferably constructed as shown in Fig. 3 so that they may be internally heated by suitable burners 21, thus maintaining said members and likewise the slots 13 at a relatively high temperature.

It is the heated condition of the members 11 and 12 to which the present invention has particular reference. The relatively high temperature of said members will tend to cause the glass forming the sheet borders 14 to stick in the slot 13, care being taken however to prevent said members from becoming too hot, making it impossible to draw the sheet borders therethrough. The sticking tendency of the sheet borders in the slot 13, if properly controlled, will create the necessary drag at the sheet edges and also prevent the sheet from narrowing at its base. The sides of the slot 13 are preferably smooth, but may be roughened if found necessary to do so.

The modification shown in Fig. 4 shows a manner in which both members or jaws 11' and 12' may swing in unison, thus allowing the slot 13' formed by them to freely conform to the shape of the sheet borders as the thickness thereof increases or decreases. Both members pivot about a common fulcrum 22 and are connected by means of the toggle 23 to a tie rod 24, suitably provided with a weak compression spring 25. The device as illustrated here may be heated electrically, and is shown connected to electric wires 26 and 27, thus causing the tendency of the sheet borders to stick thereto as above described.

The modification shown in Fig. 6 illustrates a manner in which a single member 28, having a fixed slot 29, and pivotally associated with the supporting bracket 16 by a pin 30, may be employed without departing from the nature of the invention. The device as illustrated here may be heated electrically by placing in the hollow space 31 suitable electrical resistors 32.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In a sheet glass drawing apparatus, means for drawing a sheet from a mass of molten glass, pivotally associated members engaging each of the sheet edges, and means for increasing the temperature of said members.

2. In a sheet glass drawing apparatus, means for drawing a sheet from a mass of molten glass, pivotally associated members forming a slot at each edge portion of said sheet, means causing said slot to substantially conform to the natural shape of the sheet edge portions, and means for increasing the temperature of the walls of said slot.

3. In a sheet glass drawing apparatus, means for drawing a sheet from a mass of molten glass, a member engaging each edge portion of said sheet, means for heating said member, and means causing said member to freely adapt itself to the shape of said sheet edge portions.

4. In a sheet glass drawing apparatus, means for drawing a sheet from a mass of molten glass, members engaging the edge portions of said sheet, means causing said members to freely adapt themselves to the shape of said edge portions, and means for maintaining said members at a temperature equal to or greater than the temperature of the portions of said sheet contacting therewith.

5. In a sheet glass drawing apparatus, means for drawing a sheet from a mass of molten glass, members contacting the edge portions of said sheet, means for maintaining said members at a higher temperature than the temperature of the glass contacting with them, and means causing said members to freely adapt themselves to the natural shape of the sheet edge portions.

6. In combination with means for drawing a sheet of glass from a mass of molten glass, of a sheet width maintaining device including members contacting the sheet edge portions, means causing said members to freely adapt themselves to the shape of said portions, and means for heating said members to a temperature equal to or greater than the temperature of the portions of said sheet portions contacted by them.

7. The process of producing sheet glass, which consists in drawing a sheet upwardly from a bath of molten glass, passing the border portions of the sheet through and in engagement with stationary members located above the molten bath, in maintaining those portions of the members in engagement with the sheet at a temperature substantially equal to or above the temperature of those portions of the sheet contacting therewith, and in causing the position of said members to be automatically varied to correspond to any variation in the thickness of the border portions of the sheet.

8. The process of producing sheet glass, which consists in drawing a sheet upwardly from a bath of molten glass, passing the border portions of the sheet through and in engagement wtih stationary slotted members located above the molten bath, in maintaining the walls of the slots in said members at a temperature substantially equal to or greater than those portions of the sheet contacting therewith, and in causing an automatic variation in the size of the slots in said members to correspond to a like variation in the thickness of the border portions of the sheet.

Signed at Lancaster, in the county of Fairfield and State of Ohio, this 2nd day of March, 1926.

LEOPOLD MAMBOURG.